(12) United States Patent
Guillot et al.

(10) Patent No.: US 7,105,083 B1
(45) Date of Patent: Sep. 12, 2006

(54) ACTIVATED CARBONS AND METHOD FOR OBTAINING SAME FROM A PARTLY MESOPHASE AND PARTLY MESOGENIC PITCH

(75) Inventors: André Guillot, Saleilles (FR); Xavier Py, Canohes (FR); Emmanuel Daguerre, Pollestres (FR); Bernard Spinner, Perpignan (FR)

(73) Assignees: Centre National de la Recherche Scientifique, Paris Cedex (FR); Manufacture de Vetements Paul Boye, Sete (FR)

( * ) Notice: Subject to any disclaimer, the term of this patent is extended or adjusted under 35 U.S.C. 154(b) by 455 days.

(21) Appl. No.: 10/130,485

(22) PCT Filed: Nov. 17, 2000

(86) PCT No.: PCT/FR00/03204
§ 371 (c)(1),
(2), (4) Date: Oct. 24, 2002

(87) PCT Pub. No.: WO01/36326
PCT Pub. Date: May 25, 2001

(30) Foreign Application Priority Data

Nov. 19, 1999 (FR) .................. 99 14607

(51) Int. Cl.
*C10C 3/00* (2006.01)
(52) U.S. Cl. ........................ 208/22; 502/437
(58) Field of Classification Search .......... 208/22, 208/23; 502/437
See application file for complete search history.

(56) References Cited

U.S. PATENT DOCUMENTS

| 4,431,623 | A | * | 2/1984 | Fug ..................... 423/447.1 |
| 4,518,482 | A | | 5/1985 | Dickakian |
| 4,597,853 | A | | 7/1986 | Moriya et al. |
| 4,806,227 | A | | 2/1989 | Beale, Jr. et al. ............. 208/22 |
| 5,973,912 | A | | 10/1999 | Kibi et al. |

FOREIGN PATENT DOCUMENTS

| DE | 3938581 | 5/1991 |
| EP | 0519483 | 12/1992 |
| EP | 0649815 | 4/1995 |
| EP | 0701011 | 3/1996 |
| FR | 2467177 | 4/1981 |
| GB | 1298938 | 12/1972 |
| GB | 1444732 | 8/1976 |
| JP | 2-80315 | 3/1990 |
| JP | 11267244 | 10/1999 |
| WO | WO 94/01198 | 5/1991 |

OTHER PUBLICATIONS

"Rompp-Lexikon Chemie", Georg Thieme Verlag Stuttgart, 10th Edition 1998, Tome 4, p. 2599.

* cited by examiner

*Primary Examiner*—Stuart Hendrickson
(74) *Attorney, Agent, or Firm*—Young & Thompson

(57) ABSTRACT

A method for obtaining activated carbons from a partly mesophased and partly mesogenic pitch containing less than about 40% of the α resins, more than about 40% of type β resins and between about 5 and 30% of type γ resins by activating the pitch preceded by its optional carbonization.

9 Claims, 6 Drawing Sheets

Figure 1:
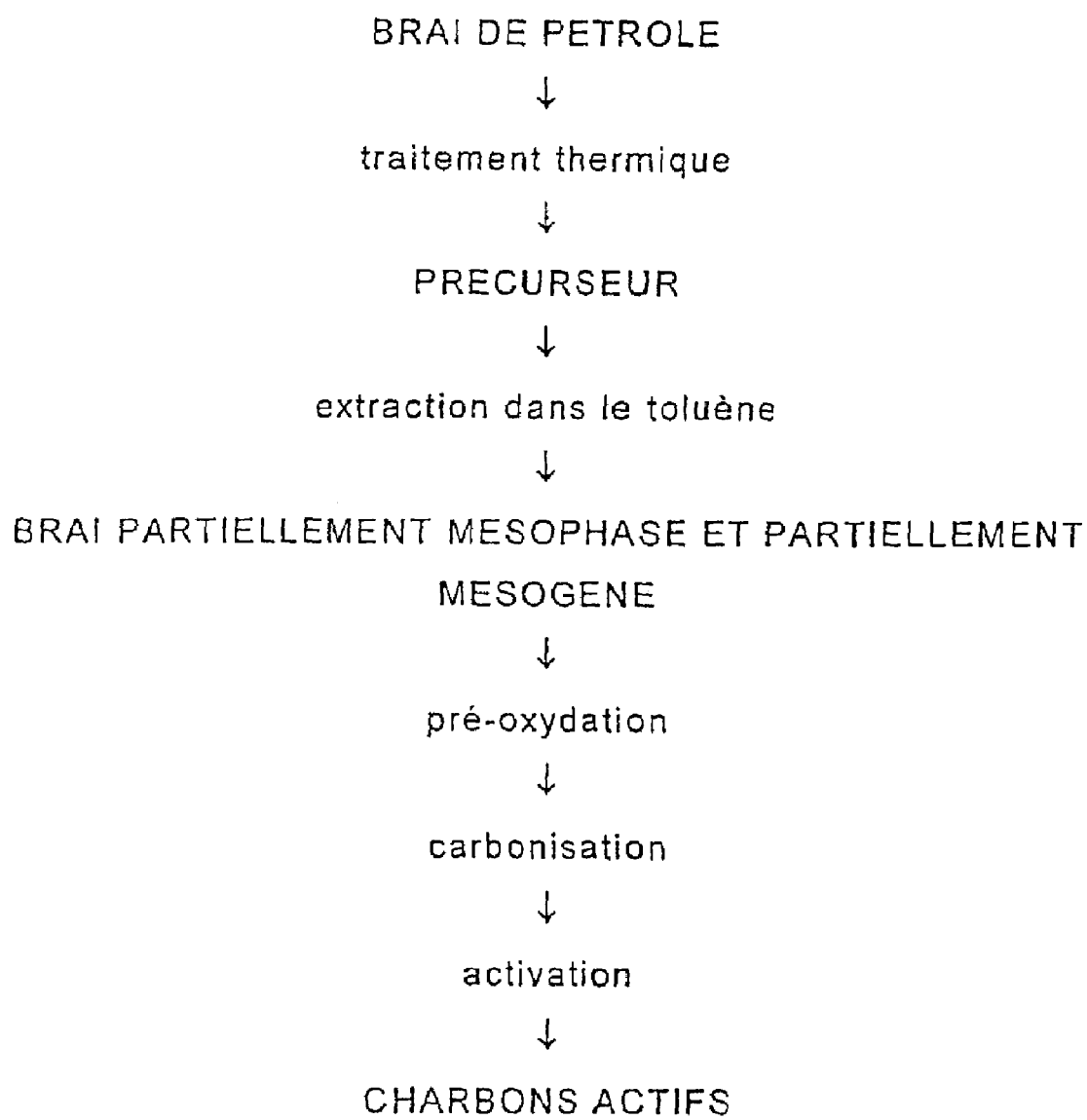

ACTIVATED CARBONS AND METHOD FOR OBTAINING SAME FROM A PARTLY MESOPHASE AND PARTLY MESOGENIC PITCH

The present invention relates to active carbons.

It also relates to a process for obtaining such active carbons from a partially mesophased and partially mesogenized pitch.

The production and the use of active carbons have increased more and more during the last twenty years, due to, among others, environment related problems. The main application fields are presently:

gas mixture separation and purification in the chemical and petroleum industry, air treatment, water treatment, and methane and other gas storage.

Other fields are involved, including that of cold production through $CO_2$ or $NH_3$ adsorption/desorption for example.

For each of such fields, except for water treatment, the developing and improving possibilities are dependent on obtaining active carbons with a controlled micropore texture and a low cost price.

Indeed, the micropore structure does determine the adsorption properties defined by two main parameters, i.e.:

the pore size, the micropore volume which determines the maximum adsorption capacity in the micropores, and the total adsorbed volume which determines the maximum adsorption capacity in all the pores and the surface.

The pores are classified into three categories according to their sizes:

micropores with a size ranging from 0 to 2 nm, mesopores with a size ranging from 2 to 50 nm, and macropores with a size higher than 50 nm.

It is generally desired that the micropore volume be the highest, although each of the applications lie on active carbons with different features.

Gas mixture separation and air treatment require active carbons with a micropore size being determined by the size of the gas molecules to be separated. Active carbons with the most homogeneous porosity possible and a high micropore volume are therefore preferred.

For gas storage, active carbons with a high micropore volume are preferred, having high micropore sizes and a low mesopore rate, since the gas is stored in the latter in a gas phase.

Finally, for cold production, it has been shown that improving the machinery performances is dependent on obtaining active carbon with a micropore size that varies as a function of the desired cold temperature. The machinery performance coefficient depends very highly on the homogeneity of the porosity and of the micropore volume which should be as high as possible.

As a conclusion, whatever the application field is, the need for active carbons with a controlled and homogeneous porosity and having a high adsorption capacity influences the process improvement.

A study of the possibilities offered by the manufacturers shows that the needs are far from being met nowadays. Such products used for storing gas are exemplified by those that can be obtained with the process described in U.S. Pat. No. 4,082,694. Such a process comprises a step of treating a carbon product, such as carbon or petroleum residues, with potash, followed by the activation of the resulting product through heating up to a temperature ranging from 704° C. (1300° F.) to 982° C. (1800° F.). In such patent, carbon or petroleum residues are not treated and therefore contain a very high proportion of α-type resins, defined as being insoluble in toluene and quinoline and comprising an organised aromatic fraction.

DAGUERRE et al. (1997, Carbon'87, $23^{rd}$ Biennial Conference on Carbon, 156–157) describe how to prepare active carbons by using defined fractions of a petroleum pitch designated by A240.

Following a thermal treatment, the pitch is fractionated with the help of toluene. Two fractions, designated by EP1 and EP2, defined according to their solubility in toluene and in quinoline are particularly obtained. Such fractions are then pre-oxidized at 280° C., then carbonized at 1000° C. before being activated in a carbonic anhydride stream at 900° C. The burn-off rate of the thus obtained active carbons ranges from 10 to 60%. The carbons derived from both fractions EP1 and EP2 with varying burn-off rates are characterized by the measurement of their micropore volume and the mean pore size.

It results from this brief overview of the state of the art that the resulting products do not have optimum properties for the above-mentioned applications.

The inventors have therefore attempted to find new synthesis process for active carbons so as to obtain products showing particular properties, in such applications.

It is therefore an object of the present invention to provide a process for obtaining active carbons from a partially mesophased and partially mesogenized pitch containing less than about 40% and preferably less than 30% α-type resins, more than about 40%, and preferably more than 50% β-type resins and from about 5 to 30% γ-type resins, comprising the step of activating such a pitch, optionally preceded by a step of carbonizing same.

It is meant by α-type resins, toluene and quinoline insoluble resins, by β-type resins, resins that are insoluble in toluene, but are soluble in quinoline and by γ-type resins, toluene and quinoline soluble resins.

In the present invention, the percentages (%) of the various resins are expressed relative to the total weight of all the resins.

The object of the present invention is more particularly to provide a process for obtaining active carbons from a partially mesophased and partially mesogenized pitch containing less than about 40% and preferably less than 30% α-type resins, more than about 40% and preferably more than 50% β-type resins and from about 5% to 30% γ-type resins, comprising the following steps of:

suspending the pitch in a potash solution for impregnation until an impregnated precursor is obtained, dehydrating the impregnated precursor, heating the impregnated precursor at a temperature ranging from about 300° C. to 1000° C., and washing and drying the resulting active carbon.

The present invention also relates to a process for obtaining active carbons from a partially mesophased and partially mesogenized pitch containing less than about 40% and preferably less than 30% α-type resins, more than about 40% and preferably more than 50% β-type resins and from about 5% to 30% γ-type resins, comprising the following steps of:

pre-oxidizing the pitch at a temperature ranging from 250° C. and 350° C., carbonizing it in an inert atmosphere at a temperature ranging from about 800° C. to 1000° C., activating it with a stream of a steam saturated inert gas, such as nitrogen, and recovering the active carbon.

According to a preferred embodiment of such processes, the partially mesophased and partially mesogenized pitch contains from about 10 to 35% α-type resins, from about 50 to 70% β-type resins and from about 10 to 26% γ-type resins.

Another object of the present invention is a process for obtaining active carbons from a partially mesophased and partially mesogenized pitch containing from about 25 to 40%, and preferably from 30 to 35% α-type resins, from about 40 to 60%, and preferably from 45 to 55% β-type resins and from about 15 to 30%, and preferably from 20 to 30% γ-type resins, comprising the following steps of:

oxidizing the pitch at a temperature ranging from 200° C. to 400° C. for a period of time from 10 minutes to 1 hour, carbonizing it in an inert atmosphere until a temperature ranging from 800° C. to 1000° C. is reached, activating it in a carbon dioxide stream at a temperature ranging from about 800° C. to 1000° C., and recovering the active carbon.

According to a particular embodiment of such processes, the partially mesophased and partially mesogenized pitch is obtained by selectively extracting unpolymerized γ-type resins in toluene from a pitch containing such resins. It is then a polyaromatic fraction.

According to another embodiment of such processes, the partially mesophased and partially mesogenized pitch is obtained through distilling unpolymerized γ-type resins from a pitch containing such resins.

Still according to another embodiment of the invention, the partially mesophased and partially mesogenized pitch is obtained through air bubbling within a pitch containing γ-type resins.

The pitches leading to partially mesophased and partially mesogenized pitches may include pitches from petroleum, coal, tires, vacuum pyrolysis, or also from various scraps. They may however be any other pitch or any other chemical having an aromatic potential, adapted to obtain active carbons meeting the above-mentioned needs.

The present invention additionally relates to a partially mesophased and partially mesogenized pitch containing from about 25 to 40% and preferably from 30 to 35% α-type resins, from about 40 to 60%, and preferably from 45 to 55% β-type resins and from about 15 to 30%, and preferably from 20 to 30% γ-type resins.

The processes according to the present invention make it possible to obtain various active carbons having interesting properties in the above-mentioned applications.

Such an active carbon can be characterized in that at least 80% and preferably 90% of the micropores have a size ranging from about 0.10 to 0.60 nm, preferably from about 0.25 to 0.55 nm, and a micropore volume ranging from about 0.10 to 0.30 cm$^3$/g and preferably from 0.15 to 0.25 cm$^3$/g. This active carbon type has a gate effect.

Another active carbon according to the present invention is characterized in that at least 80% and preferably 90% of the micropores have a size ranging from about 0.4 to 0.8 nm, and preferably from about 0.55 to 0.65 nm, and a micropore volume ranging from about 0.10 to 0.30 cm$^3$/g and preferably from 0.15 to 0.25 cm$^3$/g.

Still another active carbon is that characterized in that at least 80%, and preferably 90% of the micropores have a size ranging from bout 0.5 to 0.9 nm, and a micropore volume ranging from about 0.4 to 0.6 cm$^3$/g.

Such three carbons can be used as molecular sieves and generally in filtration or separation steps.

Still other objects of the present invention are filtration membranes and separation columns containing such carbons or any carbons obtained with one of the processes according to the present invention.

Another active carbon according to the invention is that characterized in that at least 80%, and preferably 90% of the micropores have a size ranging from about 0.5 to 3 nm, preferably from about 0.7 to 2.7 nm, and a micropore volume higher than about 0,8 cm$^3$/g and preferably higher than about 1.2 cm$^3$/g. It can be used for storing gas.

The present invention further relates to a gas storing component or a cold production component, more particularly through solid/gas sorption, containing at least one such active carbon or obtained with a process according to the present invention.

Any of such active carbons according to the invention may be included as a component of protective materials against gases containing deleterious radioactive, bacteriological or chemical substances, such as the materials used for manufacturing the so-called "NBC" (Nuclear, Bacteriological and Chemical protection) protective clothes, more particularly in impregnated foams for NBC clothes. Depending on the active carbon type being selected, either an adsorption will be obtained through selective affinity of the active carbon towards a gas or a determined molecule, or a high adsorption capacity for various compounds.

According to a particular embodiment, these various functions could be combined by incorporating into such protective materials at least two of the active carbons according to the invention.

The invention also relates to a protective material against gases containing radioactive, bacteriological or chemical substances comprising at least one active carbon according to the invention.

The present invention will be illustrated but without being limited by the following examples.

FIG. 1 summarizes schematically the process steps for preparing active carbons through steam activation.

Figure 2:
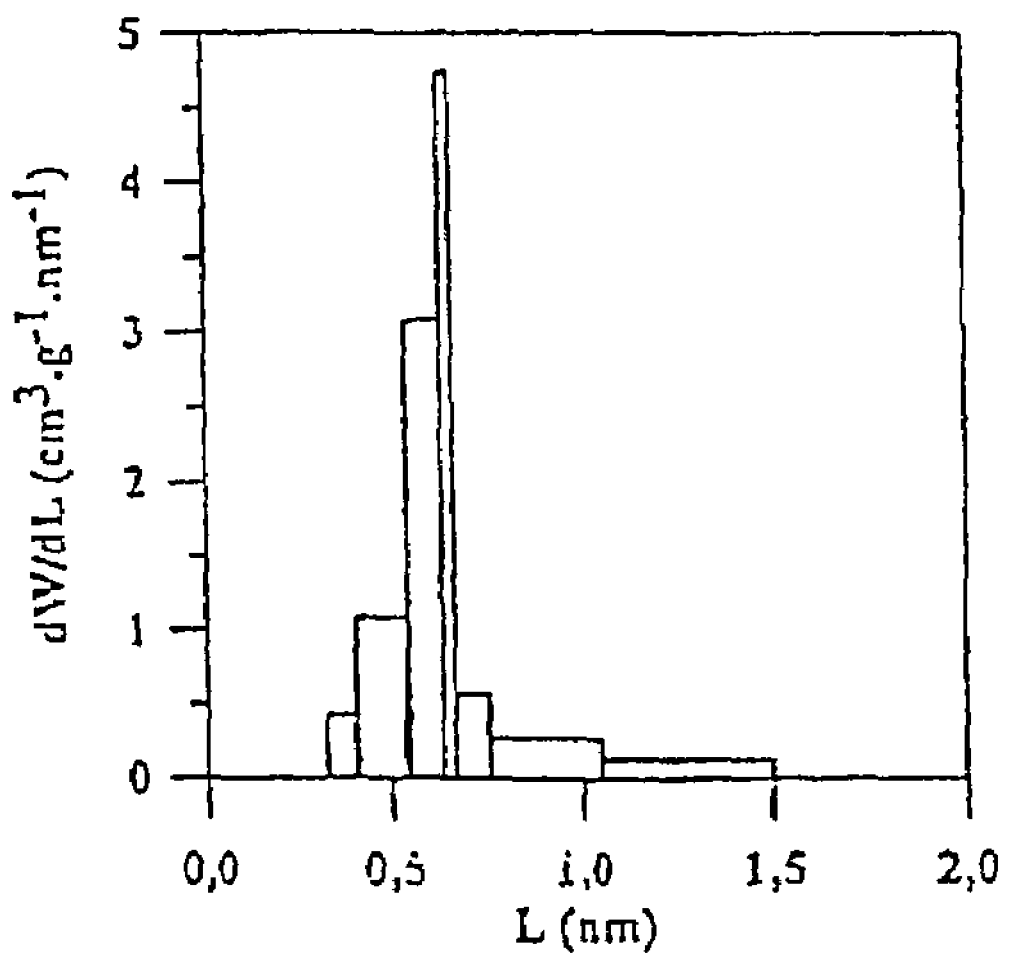

FIG. 2 shows the porosity of an active carbon obtained through steam activation.

Figure 3:
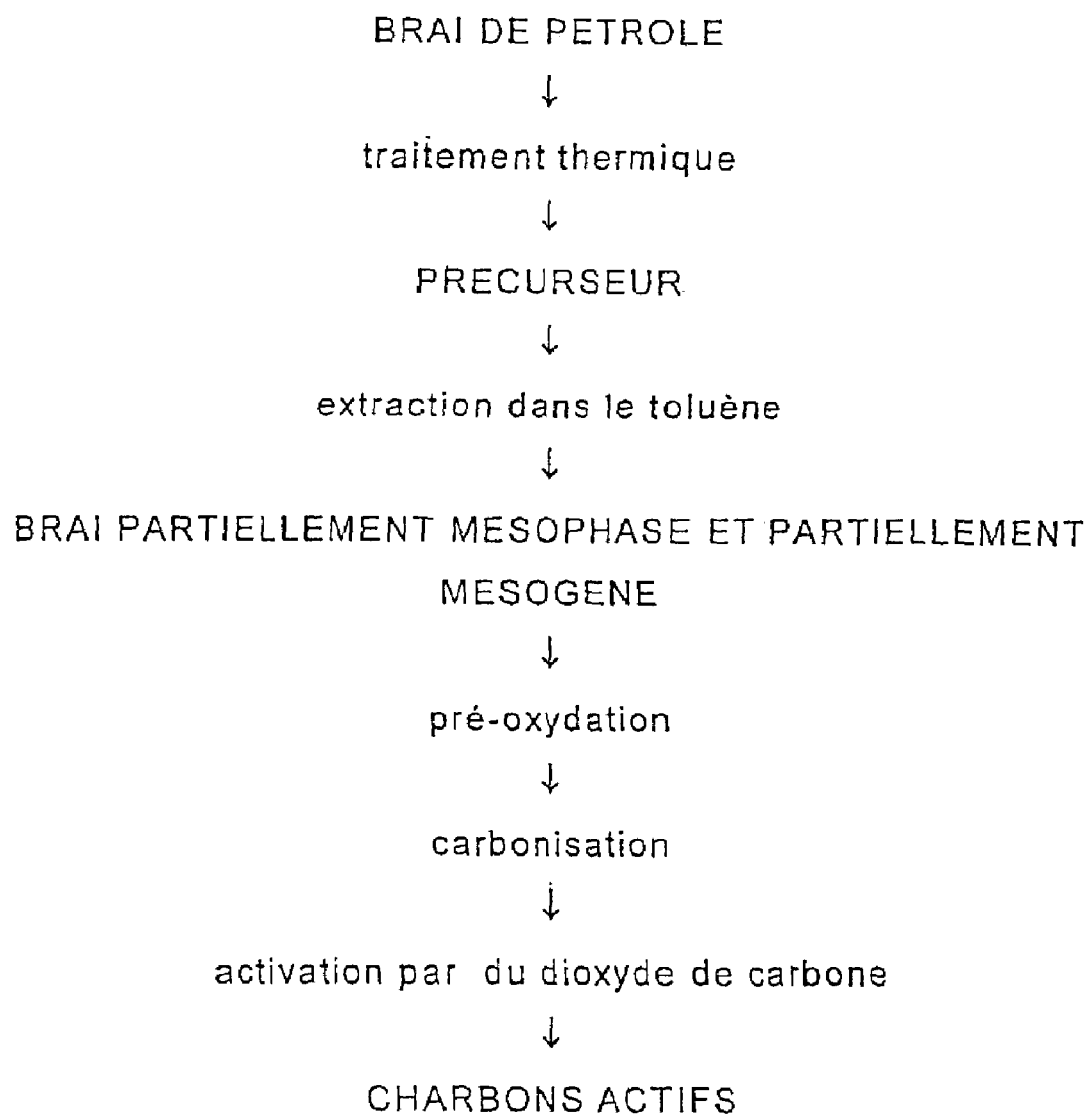

FIG. 3 summarizes schematically the process steps for preparing active carbons through carbon dioxide activation.

Figure 4:
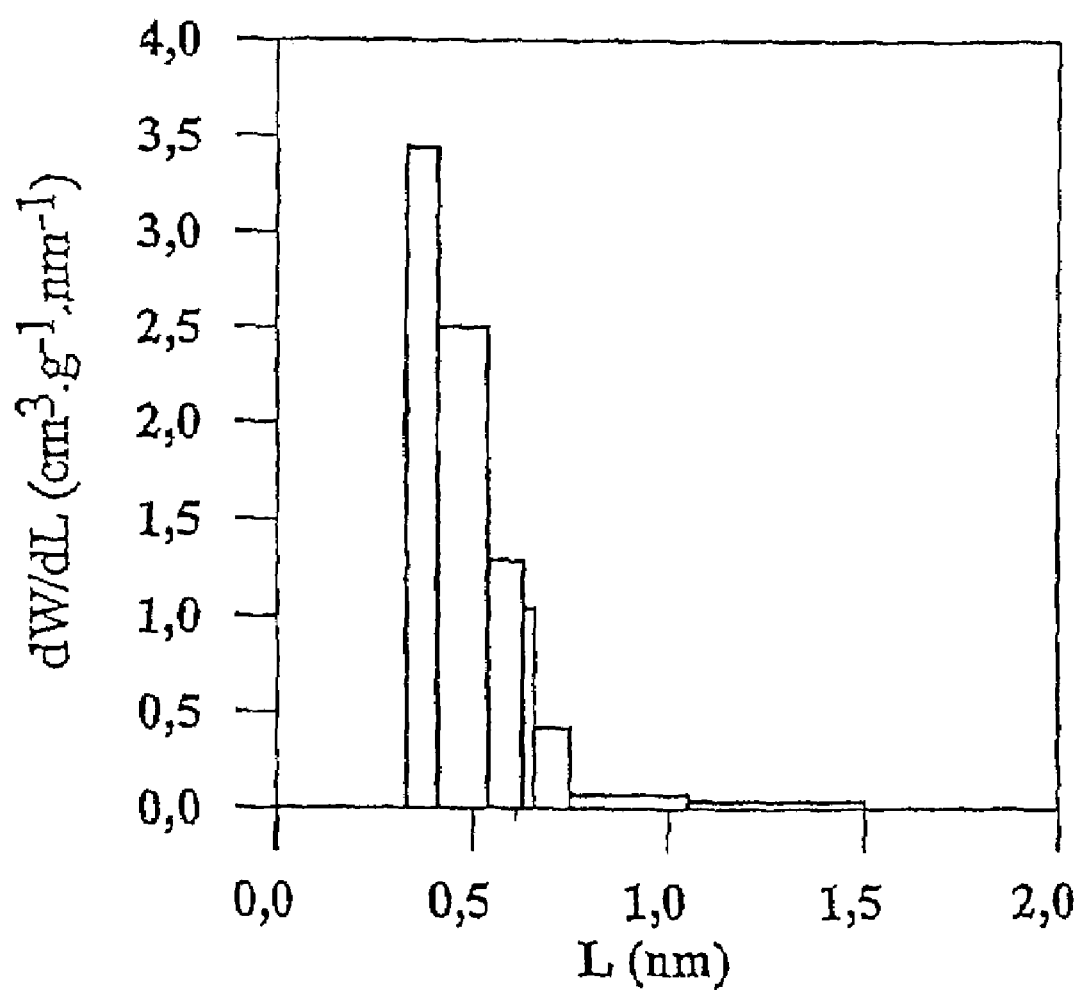

FIG. 4 shows the porosity of an active carbon obtained through carbon dioxide activation.

Figure 5:
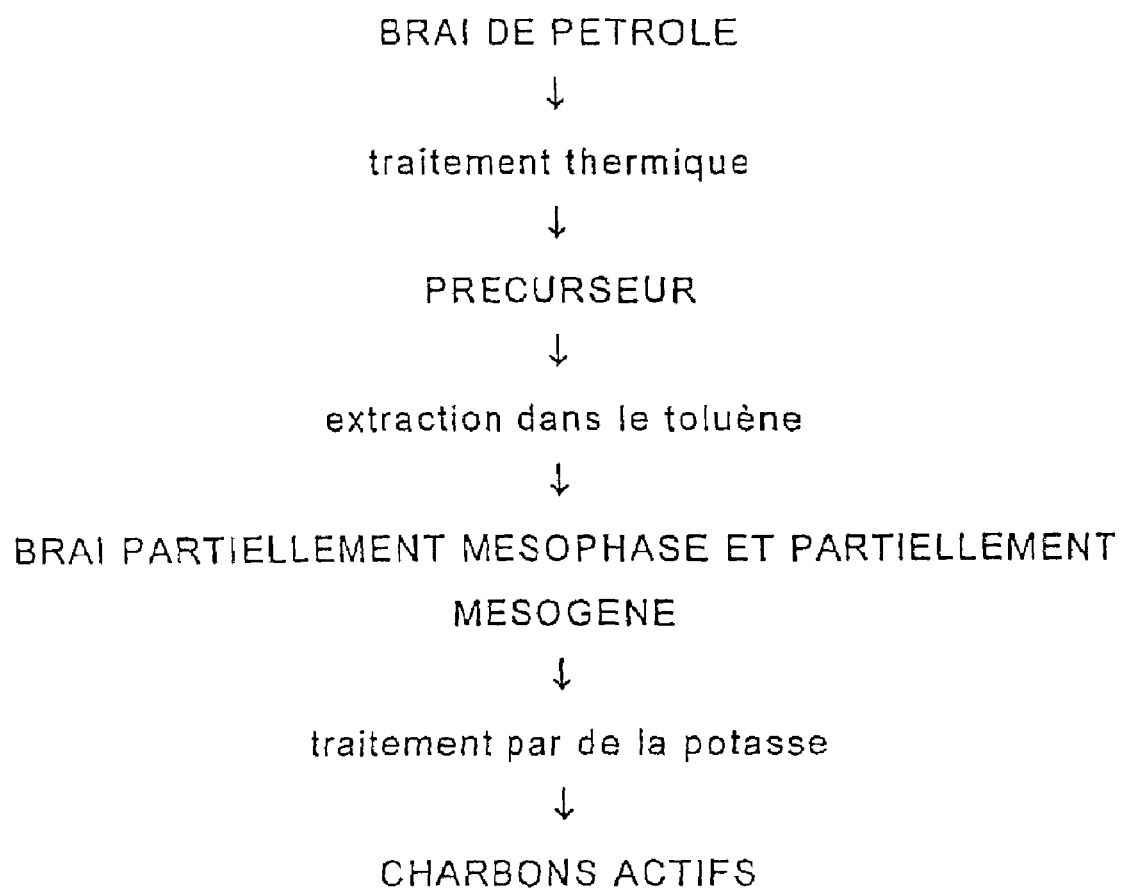

FIG. 5 summarizes schematically the process steps for preparing active carbons through potash activation.

Figure 6:
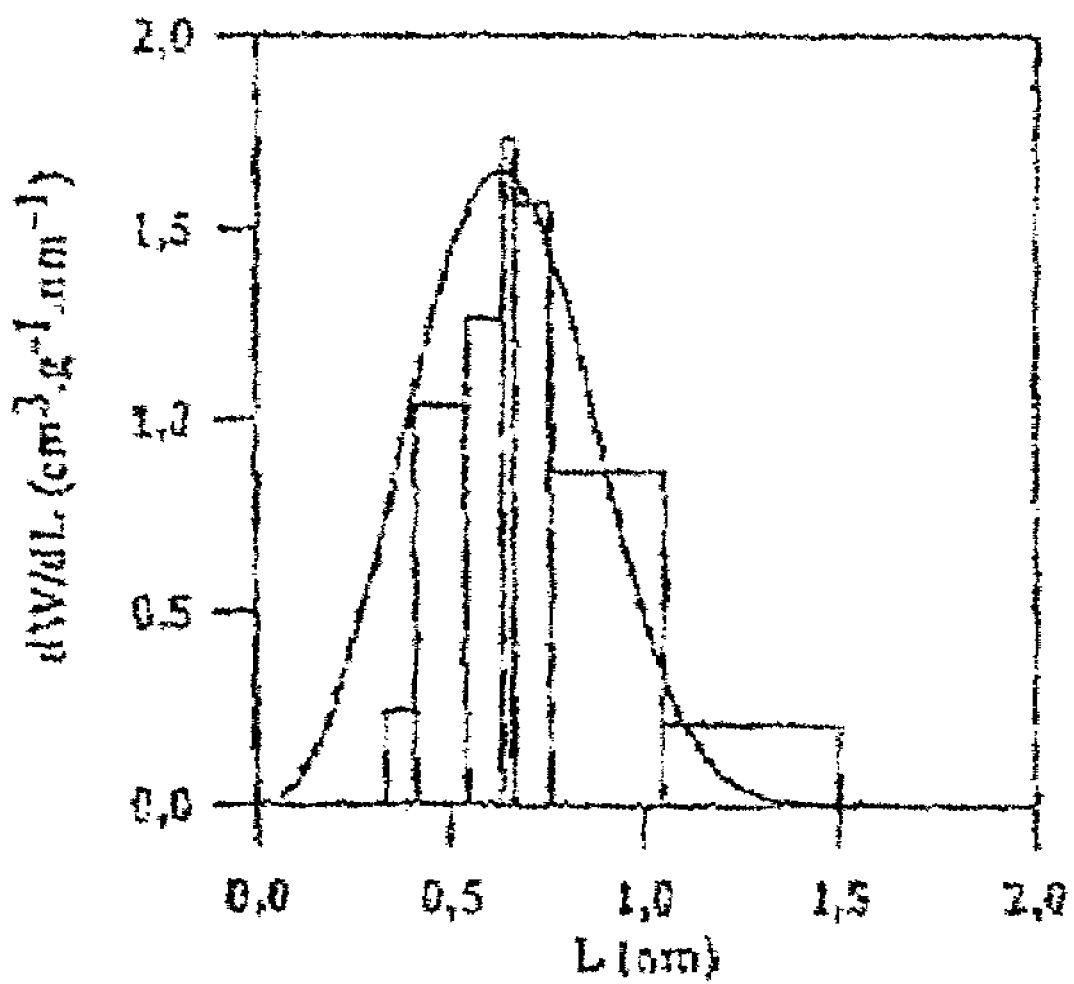

FIG. 6 shows the porosity of an active carbon obtained through potash activation for an impregnation rate of 1/1 with a pore size of 0.7 nm and a micropore volume of 0.5 cm$^3$/g.

EXAMPLE 1

Production of Active Carbons Through Steam Activation (1) Preparation of a Matured Pitch Adapted for the Production of Active Carbons The precursor being used here is an untreated coal pitch having the composition: α 11%, β 16%, γ 73% and with a 110° C. softening point and a 1.308 g/cm$^3$ density. 500 grams of pitch are placed in a 1 liter Pyrex reactor and heated in an inert atmosphere (0.5 l/min) at 2° C./min up to a temperature of 400° C. After a 5 hour maturation at such a temperature, the pitch is cooled down to room temperature. A shear stirring (a 4 blade rushton turbine with 4 counter-blades) is maintained at a speed of 500 rpm during the pitch fluidity period.

A matured pitch is thereby obtained, having a density higher than the starting pitch (1.33 g/cm³) resulting from a 5% mass loss during the thermal treatment. The composition development due to polymerization chemical reactions leads to a composition: α 15%, β 26%, γ 59%. The global mass yield of such an step is 95%.

(2) Concentration Through Extraction of the Polyaromatic Fraction

The aromatic fraction is subsequently isolated by selectively extracting the unpolymerized γ-resins in toluene. 100 grams of crushed and sieved matured pitch in particles with a size of less than 200 µm are mixed with 20 liters toluene and then filtered under vacuum. After washing with alcohol, the extraction residue is dried under vacuum. All the extraction, filtration and drying steps are performed at room temperature. The resulting extraction residue has then a composition: α 32%, β 52%, γ 16%. The global yield of such an step is 25%.

(3) Preoxidation and Carbonisation

The thus obtained extraction residue is subsequently heated in a tubular oven at 2° C./min under air (0.5 l/min) up to a temperature of 280° C. and maintained at this temperature for 30 minutes in order to enhance the oxidation performances assisting with the cross-linking of polyaromatic molecules and with the production of an infusible material. The thus obtained infusible material is subsequently carbonized under nitrogen (0.5 l/min) at 2° C./min up to a temperature of 900° C. The mass loss upon the stabilisation and carbonisation steps is 20%.

(4) Preparation of the Active Carbon Through Activation

The micropore opening and development in the carbonizate obtained in the steps (1), (2) and (3) occur in a tubular oven at 800° C. by means of a steam saturated nitrogen gas stream (0.1 l/min) by bubbling in a distilled water bath at 63° C. for a period of time ranging from 3 to 12 hours so as to obtain active carbons in the burn-off rate range from 30 to 60%.

FIG. 1 illustrates the steps of such a process.

The resulting materials have adsorbing volumes Wo ranging from 0.25 to 0.60 cm³/g corresponding respectively to micropore sizes from 0.60 to 1.50 nm. Thus, for a 2 hour activation period, a 13% burn-off rate is obtained. The active carbon has a homogeneously distributed pore size around 0.6 nm, as illustrated in FIG. 2, and a micropore volume of 0.2 cm³/g. Such an active carbon can be used as a molecular sieve.

The production of highly activated active carbons (80% burn-off rate) results in active carbons with micropore volumes higher than 0.8 cm³/g and a pore size in the order of 2 to 3 nm.

EXAMPLE 2

Production of Active Carbons Through Carbon Dioxide Activation

The procedure presented in example 1 has been repeated except for the activation procedure which is performed at 900° C. under a carbon dioxide stream (0.5 l/min) for a period of time allowing to obtain a burn-off rate less than 15% in mass.

FIG. 3 summarizes schematically such a process.

The thus obtained active carbon has a micropore volume of 0.20 cm³/g and a porosity essentially made of micropores having a size from 0.3 to 0.5 nm. This so-called gate effect microporosity type gives such an active carbon a very high selectivity towards various adsorbates.

The evidence of such a property is achieved through the immersion calorimetry technique in various organic liquids with a molecular dimension ranging from 0.33 to 1.5 nm.

The pore size distribution is illustrated in FIG. 4.

EXAMPLE 3

Production of Active Carbons with a Homogeneous Porosity, a Small Pore Size and a High Adsorption Capacity Through Potash Treatment The procedures (1) and (2) for preparing an ex-pitch precursor concentrated in polyaromatic molecules presented in example 1 have been repeated and the resulting precursor is suspended in a potash normal solution. Such blend is made in the presence of a surfactant in order to make easier the suspension of the pitch particles which are initially hydrophobic. Such blend is dehydrated under stirring for 2 to 3 hours and the resulting impregnated pitch is heated at 800° C. under a nitrogen stream (0.5 l/min) with a heating speed of 10° C./min in a nickel cell. After two hour treatment at this temperature, the resulting active carbon is cooled down and suspended in water while avoiding any contact with the room air (a contact with the air result in a spontaneous combustion of the reagent). The active carbon is subsequently filtered and washed with water until a filtrate with a neutral pH is obtained.

FIG. 5 summarizes the steps of such a process.

Such an active carbon impregnated in conditions respecting a 1:1 mass ratio of the ex-pitch precursor to the potash results, after a 15% mass loss, in an active carbon, the microporosity of which is centred at 0.6 nm, as illustrated in FIG. 6, and the micropore volume Wo of which is 0.5 cm³/g. It is to be noticed the strong adsorption capacity which is about twice that of the active carbons with a similar micropore structure.

The increase of the impregnation mass ratios up to potash impregnation ratios of 1:4 or more makes it possible to obtain active carbons with a micropore volume higher than 1.3 cm³/g and with pore sizes close to 2 nm.

EXAMPLE 4

Production of Active Carbon from a Potash Treated Distilled Pitch

A coal pitch with an initial composition γ=84.5%, β=13.5% and α=1.9% (primary insolubles in quinoline) has been subjected in a first stage to a thermal treatment (2° C./min) under an inert atmosphere (nitrogen stream 0.5 l/min) at 470° C. with no maturation plateau. Such a treatment allows to increase the initial rate of β-resins without however developing too many α-resins. The resulting pitch contains at that stage of the process 4% α-resins, 23.7% β-resins and 72.3% γ-resins.

Such a thermal treatment is, with respect to the pitch composition modification, equivalent to the treatment in example 1 (400° C./5 hours). Thus, there is an option possibility between a thermal treatment process with a plateau or a process with only a thermal ramp.

The modified pitch is then distilled under reduced pressure in order to remove the γ-resins, 125 grams of modified pitch are fed into a 500 milliliter reactor and heated up to 380° C. at a speed of 10° C./min. After a perfectly fluid pitch is obtained (at about 180° C. in the present case), a dynamic vacuum (10 mm Hg) being achieved by a vacuum pump is created in the reactor. The volatile materials are brought about towards a condenser by means of a thermostated pipeline at 250° C. Throughout the whole distillation, the pitch is subjected to a stirring step (pumping stirrer with 4 inclined blades, 300 rpm) in order to homogenize its composition. A mesogenized pitch with a composition: α 14% β=62% γ=24% and a density d=1.344 cm³/g is obtained. The global yield of the thermal treatment and distillation steps is then 60%.

The activation of such a pitch through the procedure presented in example 3 results in the production of active carbons similar to the materials obtained through activation of an extracted pitch. Their properties are presented in the table hereunder.

EXAMPLE 5

Production of Active Carbon from a Bubbling Oxidized Potash Treated Pitch 500 grams of pitch, similar to that of example 4, have been crushed and fed into a stainless steel 1 liter reactor. The pitch is heated at 300° C. with a heating speed at 2° C./m. and maturated at this temperature for a 5 hour period. The air bubbling (0.5 l/min) within the pitch is performed by a sintered stainless steel bubbler welded with the reactor basis, whereas a mechanical stirring performed by a 4 blade rushton turbine associated with a set of 4 counter-blades, guarantees a homogeneous distribution of the reactive gas within the pitch. Finally, an immersed thermocouple connected with a regulator allows to control the maturation temperature at ±1° C.

The pitch stirring and the reactive bubbling start as soon as a thoroughly liquefied pitch is obtained, i.e. from 180° C.

After maturation, the stirring and the bubbling steps are stopped and the pitch is cooled down to room temperature under an inert atmosphere. The pitch is then crushed. Its resin composition is: 23.1% α-resins, 59.0% β-resins and 17.9% γ-resins. Its density is 1.32 cm³/g. It is comparatively lower than that of the products presented in examples 1 to 4 obtained by thermal treatments at a higher temperature. The global yield is 75%.

The activation of such a pitch through the procedure presented in example 3 leads to the production of active carbons similar to those obtained through activation of an extracted pitch.

Their properties are presented in the table hereunder.

TABLE

Characteristics of the active carbons from examples 4 and 5

| Impregnation Rate | Distillation in example 4 | | | Bubbling in example 5 | | |
| --- | --- | --- | --- | --- | --- | --- |
| | Lo | Wo | Total V | Lo | Wo | Total V |
| 0.5 | 0.60 | 0.32 | 0.33 | | | |
| 1 | 0.75 | 0.48 | 0.50 | 0.85 | 0.54 | 0.54 |
| 2 | 0.95 | 0.58 | 0.62 | 1.20 | 0.69 | 0.75 |
| 3 | 1.35 | 0.64 | 0.74 | 1.50 | 0.85 | 0.95 |
| 4 | 1.95 | 0.84 | 1.04 | 1.90 | 0.92 | 1.04 |
| 5 | | | | 2.80 | 1.14 | 1.30 |

Wo: micropore volume in cm³/g
Lo: mean pore size in nm

The invention claimed is:

1. A process for obtaining active carbons from a partially mesophased and partially mesogenized pitch containing about 10–35% α-type resins, about 50 to 70% β-type resins and from about 10–25% γ-type resins through activation of said pitch optionally preceded by the carbonization thereof.

2. A process according to claim 1, comprising the following steps of:

suspending the partially mesophased and partially mesogenized pitch in a potash solution for impregnation until an impregnated precursor is obtained, dehydrating the impregnated precursor, heating the impregnated precursor at a temperature range from about 300° C. to 1000° C., and washing and drying the resulting active carbon.

3. A process according to claim 1, comprising the following steps of:

pre-oxidizing the partially mesophased and partially mesogenized pitch at a temperature ranging from 250° C. to 350° C., carbonizing it in an inert atmosphere at a temperature ranging from about 800° C. to 1000° C., activating it by a steam saturated inert gas stream, and recovering the active carbon.

4. The process for obtaining active carbons according to claim 1, wherein said process comprises the following steps of:

oxidizing the pitch at a temperature ranging from 200° C. to 400° C. for a period of time from 10 minutes to 1 hour, carbonizing it in an inert atmosphere until a temperature ranging from 800° C. to 1000° C. is reached, activating it in a carbon dioxide stream at a temperature ranging from about 800° C. to 1000° C., and recovering the active carbon.

5. A process according to claim 1, characterized in that the partially mesophased and partially mesogenized pitch is obtained by selectively extracting the unpolymerized γ-type resins in toluene from a pitch containing such resins.

6. A process according to claim 1, characterized in that the partially mesophased and partially mesogenized pitch is obtained through distilling unpolymerized γ-resins from a pitch containing such resins.

7. A process according to claim 1, characterized in that the partially mesophased and partially mesogenized pitch is obtained through air bubbling within a pitch containing unpolymerized γ-resins.

8. A process according to claim 1, characterized in that the pitch is a coal pitch.

9. A partially mesophased and partially mesogenized pitch, comprising from about 10 to 35% α-type resins, from about 50–70% β-type resins and from about 15 to 30% γ-type resins.

* * * * *